(12) United States Patent
Tannenbaum

(10) Patent No.: US 6,761,964 B2
(45) Date of Patent: Jul. 13, 2004

(54) FLUOROPOLYMER NON-STICK COATINGS

(75) Inventor: Harvey P. Tannenbaum, Wynnewood, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 75 days.

(21) Appl. No.: 10/108,967

(22) Filed: Mar. 27, 2002

(65) Prior Publication Data

US 2003/0021988 A1 Jan. 30, 2003

Related U.S. Application Data

(60) Provisional application No. 60/280,894, filed on Apr. 2, 2001.

(51) Int. Cl.[7] .......................... B32B 27/06; B32B 27/20; B32B 27/30
(52) U.S. Cl. ....................... 428/213; 428/325; 428/332; 428/421
(58) Field of Search ................................ 428/213, 325, 428/332, 421, 422

(56) References Cited

U.S. PATENT DOCUMENTS

| 4,014,834 A | 3/1977 | Concannon .................. 524/104 |
| 5,079,073 A | 1/1992 | Tannenbaum ................ 428/216 |
| 5,230,961 A | 7/1993 | Tannenbaum ................ 428/422 |
| 5,250,356 A | 10/1993 | Batzar ......................... 428/421 |
| 5,562,991 A | 10/1996 | Tannenbaum ................ 428/421 |
| 5,880,205 A | 3/1999 | Tannenbaum ................ 524/520 |

FOREIGN PATENT DOCUMENTS

EP          1 016 466 A2     7/2000

*Primary Examiner*—Ramsey Zacharia

(57) ABSTRACT

The present invention relates to non-stick coatings exhibiting both excellent abrasion resistance and food release, the coatings comprising a primer layer adhered to a substrate, a midcoat layer adhered to the primer layer, and a topcoat layer adhered to the midcoat layer, the primer layer containing and encapsulating large ceramic particles spaced apart from one another and extending into the midcoat layer, the midcoat layer being reinforced and being thicker than the primer layer, whereby the ceramic particles anchor the topcoat layer from being abraded away, the topcoat layer instead becoming integrated with the midcoat layer.

12 Claims, 8 Drawing Sheets

FLUOROPOLYMER NON-STICK COATINGS

BACKGROUND OF THE INVENTION

1. Field of the Invention

This invention relates to fluoropolymer non-stick coating compositions and to substrates coated with such compositions.

2. Description of Related Art

EP 1 016 466 A2 discloses non-stick coating compositions and their application to substrates to produce adherent, highly abrasion resistant non-stick coatings. In the multicoat embodiment (fluoropolymer undercoat plus fluoropolymer overcoat), the undercoat contains large ceramic particles which extend from the undercoat to telegraph their presence through the thickness of the overcoat, thereby forming deflection points at the surface of the overcoat. The coating achieves its high abrasion resistance by these deflection points operating to deflect the abrasion force away from the coating. Example 3 discloses the preferred arrangement of the non-stick coating consisting of a primer layer, an intermediate layer and a topcoat, wherein the large ceramic particles are provided by the primer layer. The layer thicknesses are 15-20/15/5–10 micrometers, respectively. The 8.3 wt % total SiC particles in "wet" primer composition corresponds to 27.4 wt % SiC in the baked composition. Example 4 repeats Example 3, but replaces the 8.3 wt % (wet basis) SiC particles by SiC particles of different particle size, showing in FIG. 3 that as the particle size increases from 3 to 20 micrometers so does the abrasion resistance. Example 5 shows the effect on abrasion resistance of SiC amount at the same large particle size(s) in the primer composition. The 1 wt %, 3 wt %, 6 wt % and 8.3 wt % amounts (wet basis) of SiC correspond to 4.3 wt %, 12 wt %, 21 wt % and 27 wt % respectively based on the baked weight of the primer composition. As shown in FIG. 4, the coatings in which the primer contained 6 wt % and 8.3 wt % SiC (21 wt % and 27 wt %, baked basis) exhibited much better abrasion resistance than the coatings which contained the lesser amounts of SiC. The primer layer can also contain small particle inorganic film hardener, but preferably, at least 30 wt % of such hardener is the large ceramic particles While the multilayer non-stick coating of EP 1 016 466 excels in abrasion resistance, there is always the desire to have available even better non-stick coatings. The problem confronting the present invention was how to provide a non-stick coating with excellent non-stick property even after being subjected to abrasion, without sacrificing the high abrasion resistance characteristic of the EP 1016 466. In the past, achieving high abrasion resistance for non-stick coatings has meant a sacrifice in non-stick property.

BRIEF SUMMARY OF THE INVENTION

The present invention solves this problem by providing a dynamic non-stick coating, wherein the surface of the non-stick coating rearranges itself in response to abrasion force, rather than being worn away as would be the case if the coating were static. Thus, the exposed surface of the coating is in situ renewable to provide excellent non-stick property. The rearrangement of the non-stick coating is observable with the naked eye by the original smooth unpatterned surface forming a rippled pattern. This rearrangement is further observable in microscopic cross-section by the topcoat layer of the coating becoming mechanically engaged with the midcoat layer of the coating after application of abrasion force to the coating.

Thus present invention can be described as a substrate having a baked non-stick coating thereon, said non-stick coating comprising (a) a primer layer adhered to said substrate, said primer layer containing fluoropolymer, polymer binder, and inorganic film hardener, said inorganic film hardener including large ceramic particles essentially encapsulated by said primer layer and anchored therein, (b) a midcoat layer adhered to said primer layer, the encapsulated large particles in said primer layer extending into said midcoat layer, said midcoat layer containing fluoropolymer and particles of inorganic film hardener reinforcing said midcoat layer and entirely contained there within, (c) a topcoat layer containing fluoropolymer adhered to said midcoat, the anchoring of said large particles by said primer layer and the reinforcement of said midcoat layer cooperating to translate abrasion force applied to said topcoat layer into mechanical engagement between said topcoat layer and midcoat layer rather than wearing away of said topcoat layer, whereby said topcoat layer remains available in said non-stick coating to provide continuing non-stick property to said coating after application of said abrasion force.

The topcoat layer as originally applied to the midcoat layer in the formation of the non-stick coating forms a smooth but adherent interface between the layers. The mechanical engagement between the topcoat layer and the midcoat layer resulting from the abrasion force includes penetration of the topcoat layer into the midcoat layer. This interlocking relationship helps retain the topcoat layer in the coating. The rearrangement of the topcoat layer is best seen when the coating is subjected to abrasion force applied by the MTP Abrasion Test described later herein, which test includes subjecting the coating to a controlled random reciprocating abrasion. In the region of such abrasion, the smooth unpatterned surface of the topcoat layer is converted to the appearance of a rippled pattern, which is unique for non-stick coatings, including novelty over that of EP 1 016 466 A2. Non-stick coatings heretofore other than that of the European Patent exhibit a poor MTP rating after less than 150 min. of being subjected to the MTP Abrasion Test. Coatings of the present invention (and of the European Patent) exhibit excellent ratings after at least 240 min. in the MTP Abrasion Test, preferably after at least 420 min. As described later herein, the ATP accelerated cooking test reveals the superior abrasion resistance even over the coatings of the European patent.

In one embodiment of the present invention, the non-stick coating relies upon the presence of large ceramic particles being present in the primer layer as does EP 1 016 466, but at less than the optimum amount disclosed in the European Patent, together with a greater reinforcement effect applied by the midcoat layer. Preferably, the primer layer contains 5 to 20 wt % of said large ceramic particles. The primer layer anchors the large ceramic particles within the coating, and this anchoring is reinforced by the midcoat layer. The relatively small amount of large ceramic particles translates to greater spacing between them in their anchored positions. These anchored large ceramic particles resist abrasion force applied to the topcoat, i.e. deflect such force away from the coating. At the same time these anchored particles resist the flow of the topcoat layer in the direction of the applied abrasion force past the anchor points provided by the large ceramic particles.

Preferably the midcoat layer contains at least 8 wt. % of said inorganic film hardener. Despite the greater reinforcement of the midcoat layer of the present invention, as compared to the midcoat layer in the European Patent, which contains 5.4 wt % alumina (Table 8 of EP 1 016 466 A2), based on the baked weight of the layer, the rearrangement of the topcoat layer caused by the abrasion force is translated to movement of the topcoat layer into the midcoat layer, in an interlocking relationship. This together with the anchor protection provided by the large ceramic particles causes the topcoat layer to resist wearing away. Thus, the topcoat layer remains present in the non-stick coating to provide continuing non-stick property, even after being subjected to abrasion.

For simplicity and reflecting the major application of the non-stick coating of the present invention, the non-stick property of the coating will generally be described in terms of food release. Weight percents expressed herein are based on baked weight of the particular layer in question unless otherwise indicated; the baking drives off all volatile materials in the original coating composition, which are therefore not considered in determining such weight percent.

Whereas improved abrasion resistance by a non-stick coating has heretofore been accompanied by sacrifice in food release, the coating of the present invention exhibits both excellent abrasion resistance and excellent food release, even after being subjected to abrasion. Example 3 herein shows the superior food release of the coating of the present invention after abrasion of the topcoat layer.

In another preferred embodiment of the present invention, the midcoat layer is at thicker than said primer layer.

In still another preferred embodiment, the primer layer is relatively thin, e. g. no greater than 14 micrometers thick. Nevertheless the primer layer is able to encapsulate the large ceramic particles and together with the reinforced midcoat layer anchor them firmly in place to resist the abrasion force. The combination of the thin primer layer with the thicker midcoat layer, together with the reinforcement of the midcoat layer transmit the anchoring effect of the large ceramic particles in the primer layer to the midcoat layer, enabling the midcoat layer to, in turn, anchor the topcoat. Preferably, the combination of the midcoat and topcoat layers is at least 200% the thickness of the primer layer. Preferably the total thickness of the coating is no greater than 50 micrometers.

A preferred coating of the present invention can be described as a substrate having a baked non-stick coating thereon, said non-stick coating comprising (a) a primer layer adhered to said substrate, said primer layer containing fluoropolymer, polymer binder, and inorganic film hardener, said inorganic film hardener comprising large ceramic particles essentially encapsulated by said primer layer and anchored therein and smaller particles totally contained with the thickness of the primer layer, said large particles constituting no greater than 20 wt % of said primer layer.

(b) a midcoat layer adhered to said primer layer, the encapsulated large ceramic particles in said primer layer extending into said midcoat layer, said midcoat layer containing fluoropolymer and at least 8 wt % of particles of inorganic film hardener, said particles being entirely contained within said midcoat layer, said midcoat layer being thicker than said primer layer (c) a topcoat containing fluoropolymer adhered to said midcoat.

Preferably, said large ceramic particles comprise less than 30 wt % of the total weight of the inorganic film hardener in the primer layer.

Still another embodiment of the present invention is the preferred coating just described which does not require the presence of the film hardener in the midcoat. The combination of the relatively small amount of large ceramic particles in the primer together with the presence of the relatively thick midcoat layer, preferably at least 50% thicker than the primer layer, provides a non-stick coating that exhibits both excellent abrasion resistance and non-stick (food release) character.

DETAILED DESCRIPTION OF THE INVENTION

Figure 6A:
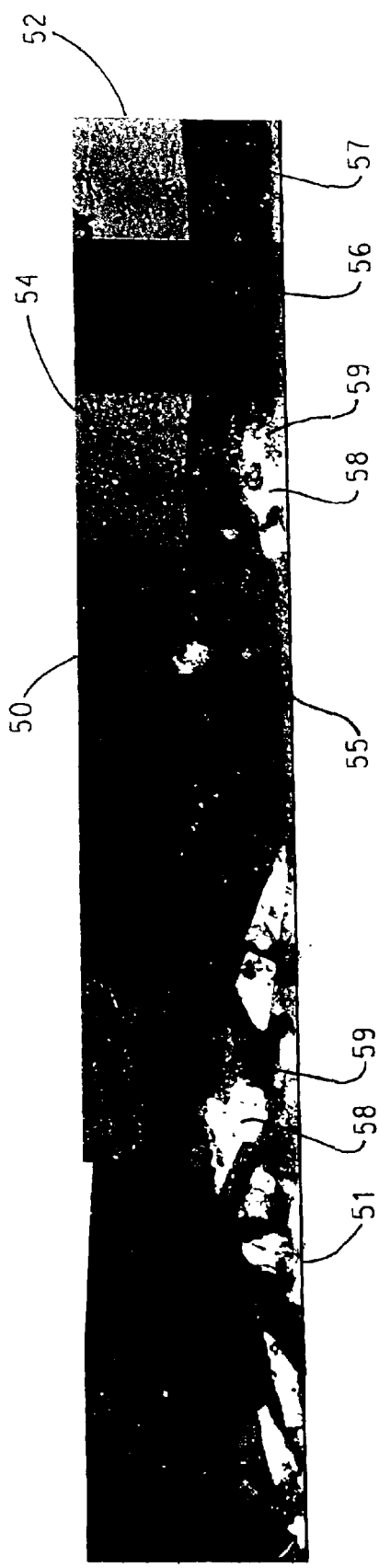
FIGS. 6A and 6B are photomicrographs at 860× magnification of the cross-section of a non-stick coating of the present invention.
Figure 6B:
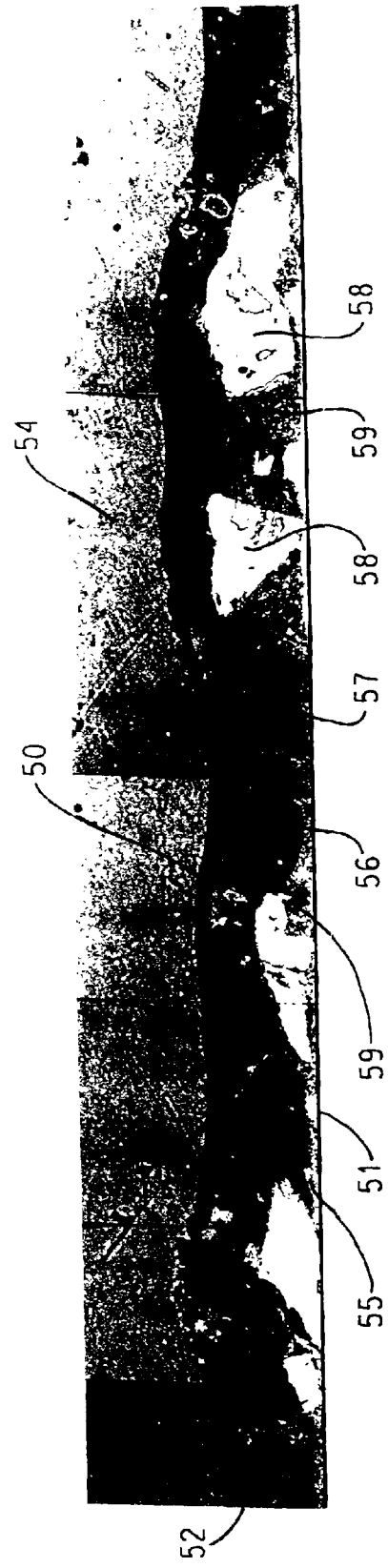
Figure 7A:
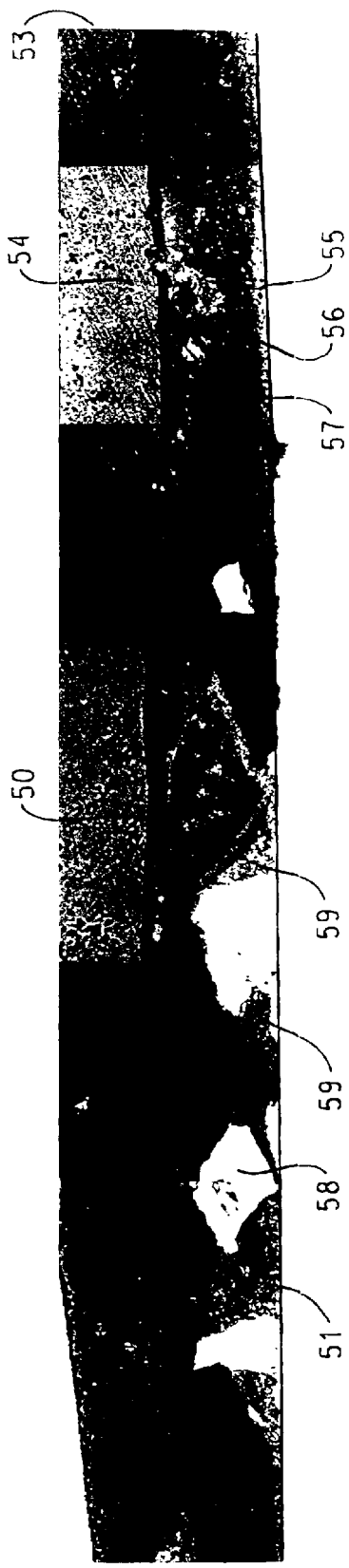
FIGS. 7A and 7B are photomicrographs at 860× magnification of a different length of cross-section of non-stick coating of the present invention.
Figure 7B:
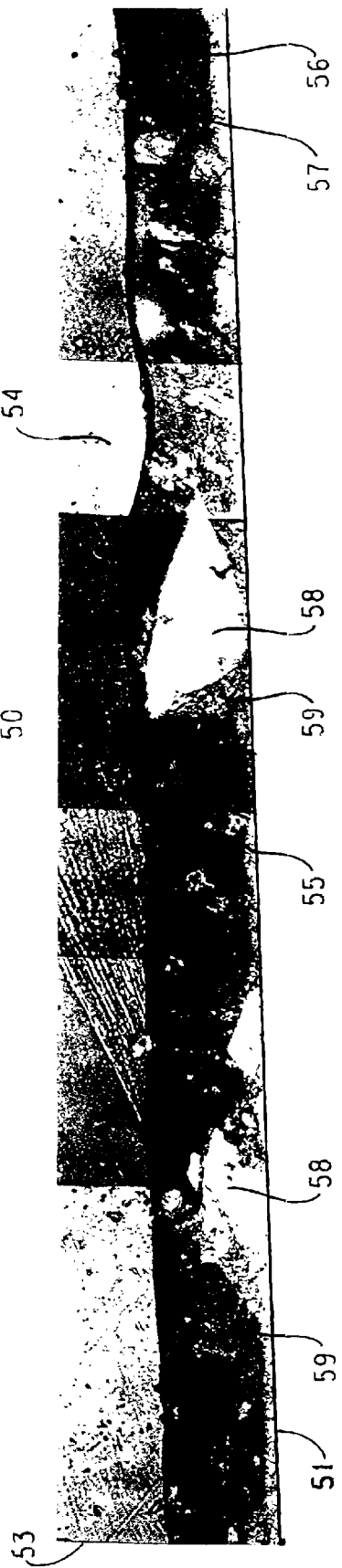

The phenomenon of the present invention, excellence in both abrasion resistance and food release, can best be understood by reference to FIGS. 6A, 6B, 7A, 7B, and 8. The cross-section of the non-stick coating 50 adhered to substrate 51 (after baking) shown in FIGS. 6A, 6B, 7A, and 7B reveals the internal structure of the coating. To first explain the makeup of the photomicrographs, FIGS. 6A and 6B are a continuum of the cross-section, the photomicrographs having been cut at ends 52 and shown as separate Figs, so as to be able to show a longer length of cross-section. If the ends 52 were brought together, then the original uncut continuum would be obtained. Similarly, FIGS. 7A and 7B are also a continuum of the cross-section, but of a different length (from a different section of the coating 50), the photomicrographs having been cut at ends 53. The substrate 51 is a thick section of aluminum having a smooth surface to which the coating 50 is adhered. Because the substrate cross-section photographs "white", it is invisible in the photomicrograph. For clarity, the photomicrographs have been "touched up" by the addition of a line that represents the smooth surface of the substrate to which the coating 50 is adhered. This line is labeled as substrate 51, it being understood, however, the actual substrate has a thickness more than 100 times the thickness of the coating. The coated substrate has an overlying layer 54 of epoxy resin which is added after baking of the coating to stabilize the coating when the coated substrate is sawed into two sections to reveal the cross-section of the coating (and substrate). The straight vertical lines visible in each photomicrograph are not structural features of the coating 50, but are edges of individual photomicrographs assembled to form the continuous cross-sections shown.

With respect to the internal structure of coating 50 revealed in the photomicrographs, primer layer 55 is the relatively thin layer adhered the substrate 51 as shown in FIGS. 6A, 6B, 7A, and 7B. A relatively thick midcoat layer 56 overlies and is adhered to primer layer 55, and a topcoat layer 57 overlies and is adhered to midcoat layer 55. Primer layer 55 is light in appearance relative to the darker appearance of the midcoat layer 56. Both the primer layer and midcoat layer exhibit a speckled appearance, this being from the presence of small particles of inorganic film hardener in each layer. The appearance of the topcoat layer 57 differs from that of the primer and midcoat layers by being non-speckled, by virtue of inorganic film hardener not being present in the topcoat layer. The interface between midcoat layer 56 and topcoat layer 57 is smooth. While the primer, midcoat, and topcoat have been referred to as layers, it should be understood that each such layer can be made of multiple layers, particularly the relatively thick midcoat, as may be required in the spray application of the layer composition to the substrate. Multiple applications of the same layer composition to build up the layer thickness desired then integrate as a single layer of that particular composition upon drying and baking.

FIGS. 6A, 6B, 7A, and 7B also show the presence of large ceramic particles 58 in (encapsulated by) the primer layer 55 and intruding into the thick midcoat layer 56. While the primer layer 55 is very thin relative to the thickness of the midcoat layer 56, the primer layer has thick regions 59, reflecting build-up of the primer layer composition around the large particles 58, which together with encapsulation by the primer layer, serves to embed the large particles in the primer layer. The large ceramic particles are spaced apart, forming wells between them, with the wells being filled by the midcoat layer. The intrusion of the large particles 58 into the midcoat layer 56 is either entirely taken up or is almost taken up within the thickness of the midcoat layer, i.e. the presence of some of the large particles is barely visible in the surface of the topcoat layer, and some are not visible at all. The appearance of the baked topcoat layer to the naked eye, i.e. viewing the plane of the topcoat rather than the cross-section thereof, is one of smoothness and gloss.

Figure 8:
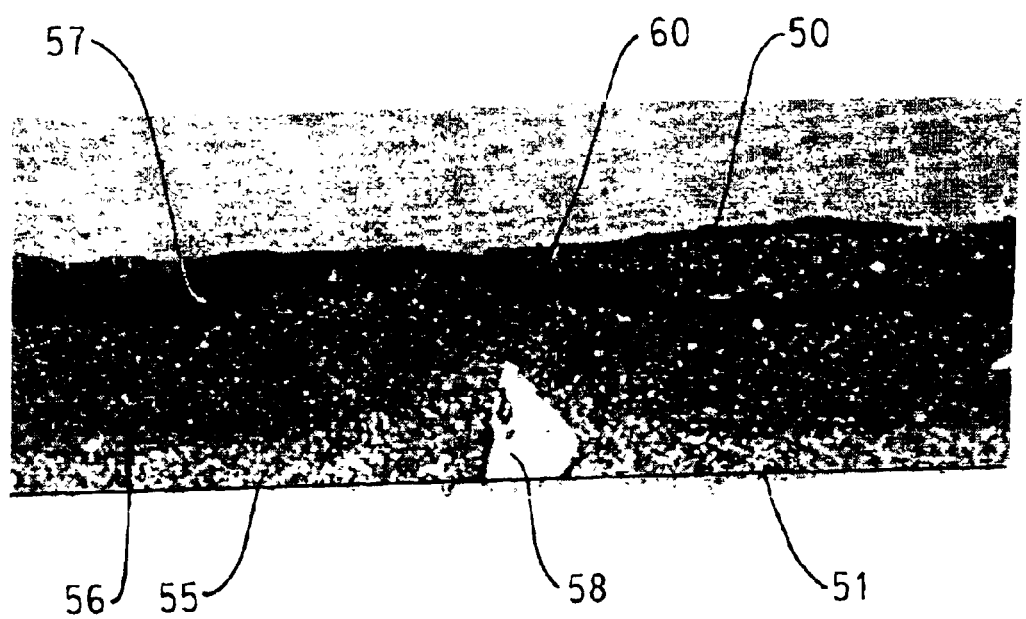
FIG. 8 is a photomicrograph at 860×magnification of the cross-section of non-stick coating of the present invention after the non-stick coating has been subjected to the abrasion tester of FIG. 1.

FIG. 8 shows the effect of abrasion of the coating 50 as carried out by the MTP Abrasion Test. As in the case of FIGS. 6A, 6B, 7A, and 7B, substrate 51 is indicated as a line upon which coating 50 is adhered. Coating 50 comprises primer layer 55, midcoat layer 56 and topcoat layer 57 adhered to one another, with a large ceramic particle 58 of inorganic film hardener being embedded in and encapsulated by the primer layer and intruding into the relatively thick midcoat layer. Instead of being orderly and sequential as in the case of when the coating was formed as shown in FIGS. 6A, 6B, 7A, and 7B, a portion 60 of the topcoat layer has become rearranged by the abrasion to extend into the thickness of the midcoat layer. Thus, instead of being abraded away by the abrasion force, a portion of the topcoat becomes integrated (mechanically engaged with) into the midcoat layer, thereby continuing to be available to provide non-stick property to the coating. It is apparent that this result arises from the spaced apart anchor points for the coating in general and for the topcoat layer in particular, corresponding to the presence of the large ceramic particles in the coating and the manner in which they are anchored.

The anchor points prevent the topcoat from being dragged away by the abrasion force, causing the topcoat layer to dip into the midcoat layer instead. The large ceramic particles also serve as deflection points for the abrasion force, deflecting it away from the coating, even though some of the large ceramic particles are not visible at the surface of the topcoat. Surprisingly, fewer deflection points nevertheless provide superior abrasion resistance, especially under cooking conditions.

Figure 4:
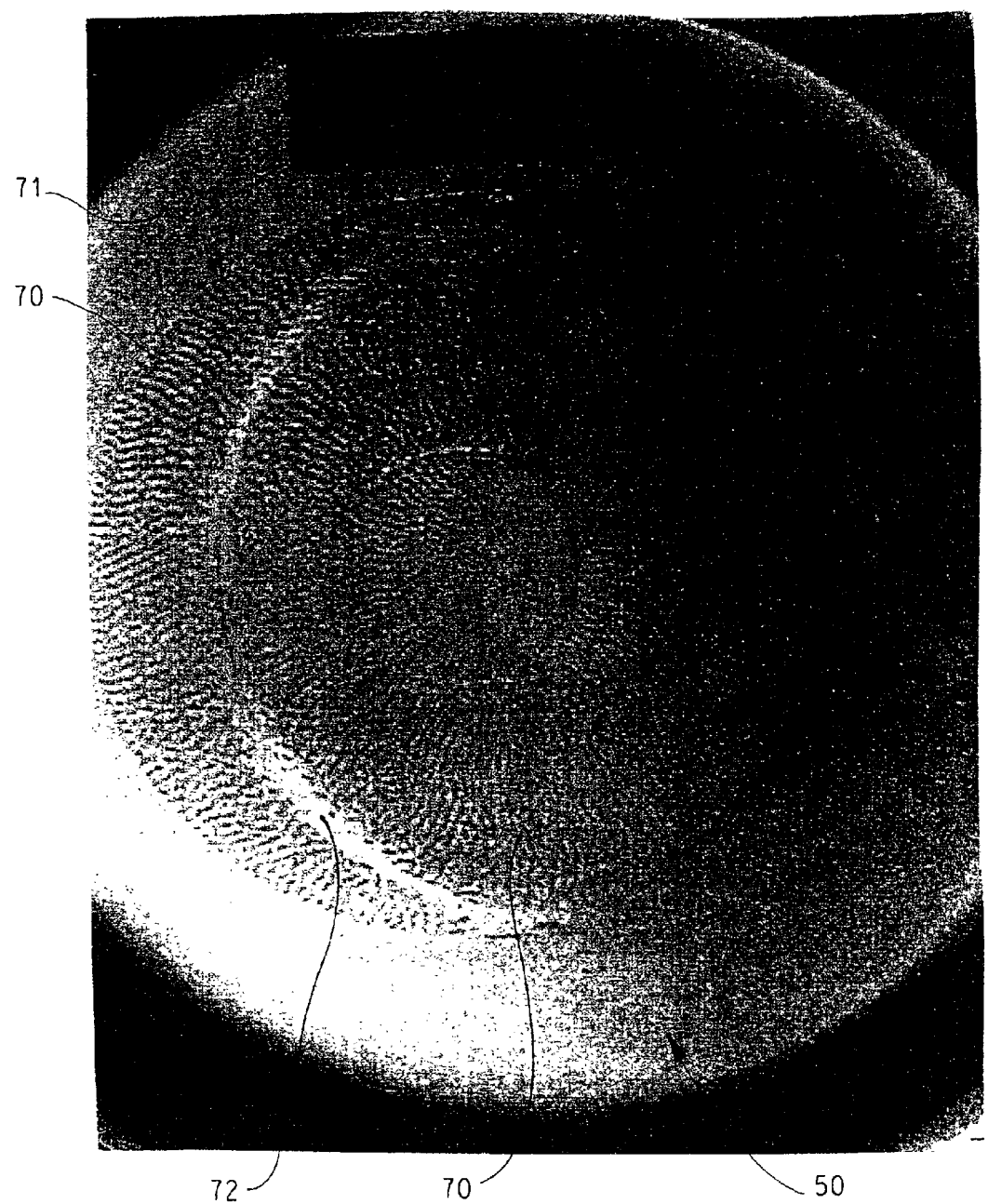
FIG. 4 is an image of cookware containing the non-stick coating of the present invention showing the abrasion pattern, including the formation of a rippled pattern, obtained using the abrasion tester of FIG. 1.

It is apparent from FIG. 8 that the repeated, reciprocating abrasion applied to the coating 50 by the MTP Abrasion Test rearranges the topcoat layer, rather than merely removing it. The result of this rearrangement is shown in FIG. 4 by the rippled pattern appearance of the abraded portion 70 of the non-stick coating 50, in contrast to the appearance of the unabraded portion 71. The unpatterned arc 72 extending through the abraded patterned portion 70 is still non-stick coating and not the wearing through of the coating to reveal the underlying substrate. The arc 72 has a shiny appearance from the reflected light of the flash photograph.

Figure 5:
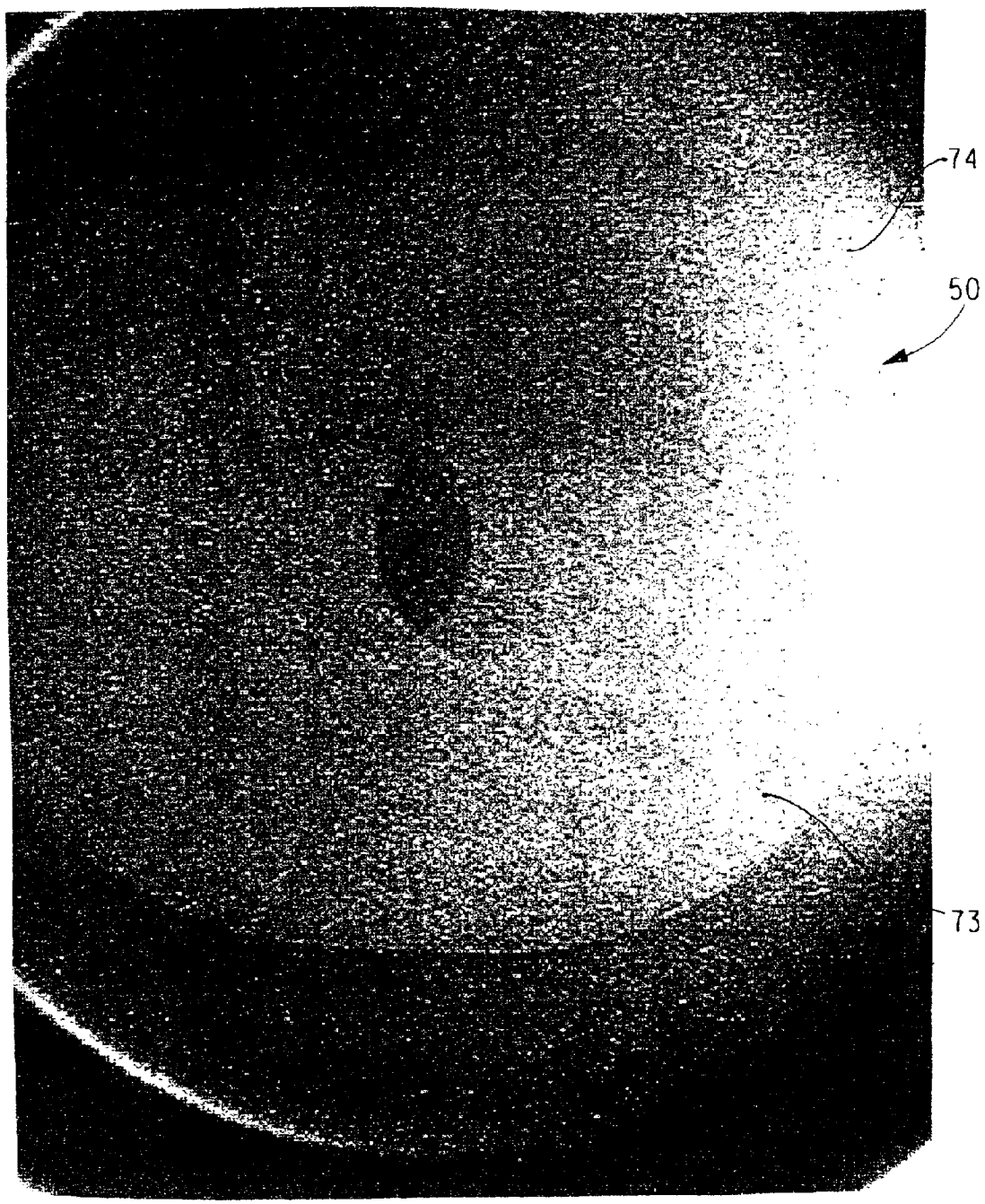
FIG. 5 is another image of the non-stick coating of EP 1 016 466 on an article of cookware after being subjected to the abrasion tester of FIG. 1.

In FIG. 5, the non-stick coating 50 of Example 3 of EP 1 016 466, has abraded portion 73, when subjected to the same MTP Abrasion Test, which is not rippled in appearance, and which resembles the unabraded portion 74 of the coating, except for showing the wear of the Abrasion Test. This MTP Abrasion Test appearance result is characteristic of all of the non-stick coatings disclosed in the European Patent up to the Test actually wearing away the coating to reveal the substrate, even when smaller ceramic particles were used or the ceramic particles were present in lesser amounts.

For the coatings shown in both FIGS. 4 and 5, the MTP Abrasion Test time was 420 min, and the fact that neither coating was worn through, demonstrates the excellent abrasion resistance exhibited by both coatings. The excellent food release of the coating of the present invention is shown in Example 3 wherein the coating of the present invention exhibits excellent food release after 300,000 cycles of abrasion, as compared to the non-stick coating of EP 1 016 466, which loses its excellent food release at 100,000 cycles of abrasion.

Fluoropolymer Resin

The fluoropolymer component of each layer of the non-stick coating composition of this invention is preferably polytetrafluoroethylene (PTFE) having a melt viscosity of at least $1 \times 10^8$ Pa·s at 380° C. for simplicity in formulating the composition and the fact that PTFE has the highest heat stability among the fluoropolymers. Such PTFE can also contain a small amount of comonomer modifier which improves film-forming capability during baking (fusing), such as perfluoroolefin, notably hexafluoropropylene (HFP) or perfluoro(alkyl vinyl) ether, notably wherein the alkyl group contains 1 to 5 carbon atoms, with perfluoro(propyl vinyl ether) (PPVE) being preferred. The amount of such modifier will be insufficient to confer melt-fabricability to the PTFE, generally being no more than 0.5 mole %. The PTFE, also for simplicity, can have a single melt viscosity but a mixture of PTFEs having different melt viscosities can be used to form the fluoropolymer component. Use of a single fluoropolymer in the composition, which is the preferred condition, means that the fluoropolymer has a single chemical identity and melt viscosity.

While PTFE is preferred, the fluoropolymer component can also be melt-fabricable fluoropolymer, either combined (blended) with the PTFE, or in place thereof. Examples of such melt-fabricable fluoropolymers include copolymers of TFE and at least one fluorinated copolymerizable monomer (comonomer) present in the polymer in sufficient amount to reduce the melting point of the copolymer substantially below that of TFE homopolymer, polytetrafluoroethylene (PTFE), e.g., to a melting temperature no greater than 315° C. Preferred comonomers with TFE include the perfluorinated monomers such as perfluoroolefins having 3–6 carbon atoms and perfluoro(alkyl vinyl ethers) (PAVE) wherein the alkyl group contains 1–5 carbon atoms, especially 1–3 carbon atoms. Especially preferred comonomers include hexafluoropropylene (HFP), perfluoro(ethyl vinyl ether) (PEVE), perfluoro(propyl vinyl ether) (PPVE) and perfluoro (methyl vinyl ether) (PMVE). Preferred TFE copolymers include FEP (TFE/HFP copolymer), PFA (TFE/PAVE copolymer), TFE/HFP/PAVE wherein PAVE is PEVE and/or PPVE and MFA (TFE/PMVE/PAVE wherein the alkyl group of PAVE has at least two carbon atoms). The molecular weight of the melt-fabricable tetrafluoroethylene copolymers is unimportant except that it be sufficient to be film-forming and be able to sustain a molded shape so as to have integrity in the primer application. Typically, the melt viscosity will be at least $1\times10^2$ Pa·s and may range up to about $60–100\times10^3$ Pa·s as determined at 372° C. according to ASTM D-1238.

The fluoropolymer component is generally commercially available as a dispersion of the polymer in water, which is the preferred form for the composition of the invention for ease of application and environmental acceptability. By "dispersion" is meant that the fluoropolymers particles are stably dispersed in the aqueous medium, so that settling of the particles does not occur within the time when the dispersion will be used; this is achieved by the small size of the fluoropolymer particles, typically on the order of 0.2 micrometers, and the use of surfactant in the aqueous dispersion by the dispersion manufacturer. Such dispersions can be obtained directly by the process known as dispersion polymerization, optionally followed by concentration and/or further addition of surfactant.

Alternatively, the fluoropolymer component may be a fluoropolymer powder such as PTFE micropowder. In which case, typically an organic liquid is used in order to achieve an intimate mixture of fluoropolymer and polymer binder. The organic liquid may be chosen because a binder dissolves in that particular liquid. If the binder is not dissolved within the liquid, then the binder can be finely divided and be dispersed with the fluoropolymer in the liquid. The resultant coating composition can comprise fluoropolymer dispersed in organic liquid and polymer binder, either dispersed in the liquid or dissolved in order to achieve the intimate mixture desired. The characteristics of the organic liquid will depend upon the identity of the polymer binder and whether a solution or dispersion thereof is desired. Examples of such liquids include N-methylpyrrolidone, butyrolactone, high boiling aromatic solvents, alcohols, mixtures thereof, among others. The amount of the organic liquid will depend on the flow characteristics desired for the particular coating operation.

Generally, the fluoropolymer will comprise 10–45 wt % of the primer layer and at least 70 wt. % of the midcoat layer, and at least 90 wt % of the topcoat layer.

Polymer Binder

The fluoropolymer composition used for the primer layer also contains a heat resistant polymer binder. The binder component is composed of polymer which is film-forming upon heating to fusion and is also thermally stable. This component is well known in primer applications for non-stick finishes, for adhering the fluoropolymer-containing primer layer to substrates and for film-forming within and as part of a primer layer. The fluoropolymer by itself has little to no adhesion to a smooth substrate. The binder is generally non-fluorine containing and yet adheres to the fluoropolymer. Preferred binders are those that are soluble or solubilized in water or a mixture of water and organic solvent for the binder, which solvent is miscible with water. This solubility aids in the blending of the binder with the fluorocarbon component in the aqueous dispersion form.

An example of the binder component is polyamic acid salt which converts to polyamideimide (PAI) upon baking of the composition to form the primer layer. This binder is preferred because in the fully imidized form obtained by baking the polyamic acid salt, this binder has a continuous service temperature in excess of 250° C. The polyamic acid salt is generally available as polyamic acid having an inherent viscosity of at least 0.1 as measured as a 0.5 wt % solution in N,N-dimethylacetamide at 30° C. It is dissolved in a coalescing agent such as N-methylpyrrolidone, and a viscosity-reducing agent, such a furfuryl alcohol and reacted with tertiary amine, preferably triethylamine, to form the salt, which is soluble in water, as described in greater detail in U.S. Pat. No. 4,014,834 (Concannon). The resultant reaction medium containing the polyamic acid salt can then be blended with the fluoropolymer aqueous dispersion, and because the coalescing agent and viscosity-reducing agent are miscible in water, the blending produces a uniform coating composition. The blending can be achieved by simple mixing of the liquids together without using excess agitation so as to avoid coagulation of the fluoropolymer aqueous dispersion. Other binders that can be used include polyether sulfone (PES) and polyphenylene sulfide (PPS).

Whether the primer composition is applied as a liquid medium, wherein the liquid is water and/or organic solvent, the adhesion properties described above will manifest themselves upon drying and baking of the primer layer together with baking of the next-applied layers of fluoropolymer to form the non-stick coating on the substrate.

For simplicity, only one binder may be used to form the binder component of the primer layer used in the present invention. However, multiple binders are also contemplated for use in this invention, especially when certain end-use properties are desired, such as flexibility, hardness, or corrosion protection. Common combinations include PAI /PES, PAI/PPS and PES/PPS.

The proportion of fluoropolymer and binder, especially if the composition is used as a primer layer on a smooth substrate, is preferably in the weight ratio of 0.5 to 2.0:1. The weight ratios of fluoropolymer to binder disclosed herein are based on the weight of these components in the applied layer formed by baking the composition after application to its substrate. The baking drives off the volatile materials present in the coating composition, including the salt moiety of the polyamic acid salt as the imide bonds are formed during baking. For convenience, the weight of binder, when it is polyamic acid salt which is converted to polyamideimide by the baking step, can be taken as the weight of polyamic acid in the starting composition, whereby the weight ratio of fluoropolymer to binder can be determined from the amount of fluoropolymer and binder in the starting composition. When the composition of the invention is in the preferred aqueous dispersion form, these components will constitute about 5 to 50 wt % of the total dispersion.

Inorganic Film Hardener

The inorganic film hardener component in the primer layer is one or more non-metallic filler type materials that are inert with respect to the other components of the composition and thermally stable at its eventual baking temperature which fuses the fluoropolymer and binder. The film hardener is water insoluble so that it is typically uniformly dispersible but not dissolved in the aqueous dispersion form of the composition of the invention. The film hardener of this invention preferably comprises large ceramic particles and small ceramic particles. The large ceramic particles have an average particle size of at least 14 micrometers, preferably at least 20 micrometers, more preferably at least 25 micrometers and even more preferably at least 35 micrometers. Such particles should not be so large that they protrude through the topcoat layer and preferably do not protrude through the midcoat layer into the topcoat layer.

The ceramic particles of the inorganic film hardener preferably have a Knoop hardness of at least 1200 and more preferably of at least 1500. Knoop hardness is a scale for describing the resistance of a material to indentation or scratching. Values for the hardness of minerals and ceramics are listed in the *Handbook of Chemistry, 77th* Edition, 12-186,187 based on reference material from Shackelford and Alexander, *CRC Materials Science and Engineering Handbook*, CRC Press, Boca Raton Fla., 1991. The film hardener component of the primer layer imparts durability to the non-stick fluoropolymer composition applied as a coating on a substrate by deflecting abrasive forces applied to the coating surface and by resisting penetration of sharp objects that have penetrated the fluoropolymer overcoat.

The large ceramic particles of the inorganic film hardener preferably have an aspect ratio of not greater than 2.5, and more preferably not greater than 1.5. By aspect ratio is meant a ratio of the longest diameter of a particle to the greatest distance of a dimension measured perpendicular to the longest diameter (major axis) of a particle. The aspect ratio is a means of quantifying a preferred particle shape and orientation. Particles with a high aspect ratio are flat or elongated, unlike the preferred particles of this invention, which are preferably more spherical and more closely approach an ideal aspect ratio of 1.

Examples of inorganic filler film hardener include inorganic oxides, carbides, borides and nitrides having a Knoop hardness of at least 1200. Preferred are inorganic oxides, nitrides, borides and carbides of zirconium, tantalum, titanium, tungsten, boron, aluminum and beryllium. Particularly preferred are silicon carbide and aluminum oxide. Typical Knoop hardness values for preferred inorganic compositions are: zirconia (1200); aluminum nitride (1225); beryllia (1300); zirconium nitride (1510); zirconium boride (1560); titanium nitride (1770); tantalum carbide (1800); tungsten carbide (1880); alumina (2025); zirconium carbide (2150); titanium carbide (2470); silicon carbide (2500); aluminum boride (2500); titanium boride (2850).

The primer layer contains an inorganic film hardener of preferably large and small particles wherein preferably 5 to 20 wt % of the inorganic film hardener are large ceramic particles. The small particles of film hardener are preferably less than 10 micrometers in average particle size, more preferably less than 5 micrometers average particle size, and even more preferably 0.1–1.0 micrometers average particle size. Preferably the primer layer contains more than 30 wt % of inorganic film hardener, preferably at least 32 wt %, and more preferably at least 35 wt %, and preferably the large ceramic particles comprise less than 30 wt % of the inorganic film hardener, more preferably less than 28 wt %. Generally, the inorganic film hardener will not exceed 60 wt % of the primer layer composition.

With respect to the midcoat layer, the inorganic film hardener can be any of the inorganic film hardeners described above with respect to the primer layer composition except that the particle size of the film hardener in the midcoat layer will be less than the thickness of the midcoat layer so as to be entirely contained within such layer. Preferably the size of the film hardener particles used in the midcoat layer are the small particle sizes preferred for the primer layer. Preferably the midcoat layer contains at least 8 wt % inorganic film hardener, more preferably 10 to 30 wt % thereof. The identity of the inorganic film hardener in the primer layer and the midcoat layer can be the same or different, and the same is true for the identity of the large and small particles of film hardener in the primer layer.

Other Fillers

In addition to the large particles and small particles of inorganic filler film hardener, the non-stick coating compositions of this invention may contain other filler materials having a Knoop hardness value of less than 1200. Suitable additional fillers include glass flake, glass bead, glass fiber, aluminum or zirconium silicate, mica, metal flake, metal fiber, fine ceramic powders, silicon dioxide, barium sulfate, talc, etc.

Coating Application

The compositions used in the present invention can be applied to substrates by conventional means. Spray and roller applications forming each layer are the most convenient application methods, depending on the substrate being coated. Other well-known coating methods including dipping and coil coating are suitable. The midcoat layer composition can be applied by conventional methods to a primer layer prior to its drying. However, when the primer and midcoat layer compositions are aqueous dispersions, the midcoat layer composition can be applied to the primer layer preferably after drying to touch. The same is true for application of the topcoat layer composition to the midcoat layer. When the primer layer is made by applying the composition from an organic solvent, and the midcoat layer is applied from an aqueous medium, the primer layer should be dried so that all water-incompatible solvent is removed before application of the midcoat layer.

A resultant composite structure can be baked to fuse all the coatings at the same time to form a non-stick coating on the substrate. When the fluoropolymer is PTFE, a quick high bake temperature is preferred, e.g., for 5 min. at a temperature starting at 800° F. (427° C.) and rising to 815° F. (435° C.). When the fluoropolymer in the primer or the overcoat is a blend of PTFE and FEP, e.g., 50–70 wt % PTFE and 50–30 wt % FEP, the bake temperature may be reduced to 780° F. (415° C.), rising to 800° F. (427° C.) in 3 minutes (total bake time).

The coated substrate of the invention preferably has a primer layer that is no greater than 0.5 mils (14 micrometers) thick, more preferably 0.4 to 0.5 mils (10–13 micrometers) thick. Preferably the midcoat layer is thicker than the primer layer and is more preferably at least 50% thicker. Preferably the midcoat layer is 0.7 to 0.9 mils (18–23 micrometers) and the topcoat layer is 0.3 to 0.5 mils (7.6–12.3 micrometers) thick. The thickness of the primer described herein is measured by the eddy-current principle (ASTM B244) after baking. The eddy current values reflect an average of values across the substrate including the height of large particle and the depth of the valleys between particles. The primer layer thickness can also be measured by sectioning the pan and measuring the thickness from a micrograph obtained from a scanning electron microscope (SEM). By using SEM, a distinction can be made between the height of the large particles and the depth of the valley between particles. SEM values that report the primer thickness in the valley between particles are about 50% of reported eddy current values. The thickness of the midcoat and topcoat layers described herein are measured by the eddy-current principle.

In the coated substrate of the present invention, the substrate can be of any material that can withstand the bake temperature, such as metal and ceramics, examples of which include aluminum, anodized aluminum, cold-rolled steel, stainless steel, enamel, glass, and pyroceram. The substrate can be smooth, i.e. having a surface profile of less than 50 microinches (1.25 micrometers) as measured by a model RT 60 surface tester made by Alpa Co. of Milan, Italy, and needs to be clean. For pyroceram and some glass, improved results are obtained by activation of the substrate surface such as by a slight chemical etch, which is not visible to the naked eye, i.e., the surface is still smooth. The substrate can also be chemically treated with an adhesion agent such as a mist coat of polyamic acid salt, such as disclosed in U.S. Pat. No. 5,079,073 to Tannenbaum.

Products having non-stick finishes of the present invention include cookware, bakeware, rice cookers and inserts therefor, water pots, iron sole plates, conveyors, chutes, roll surfaces, cutting blades, etc.

TEST METHODS

Figure 1:
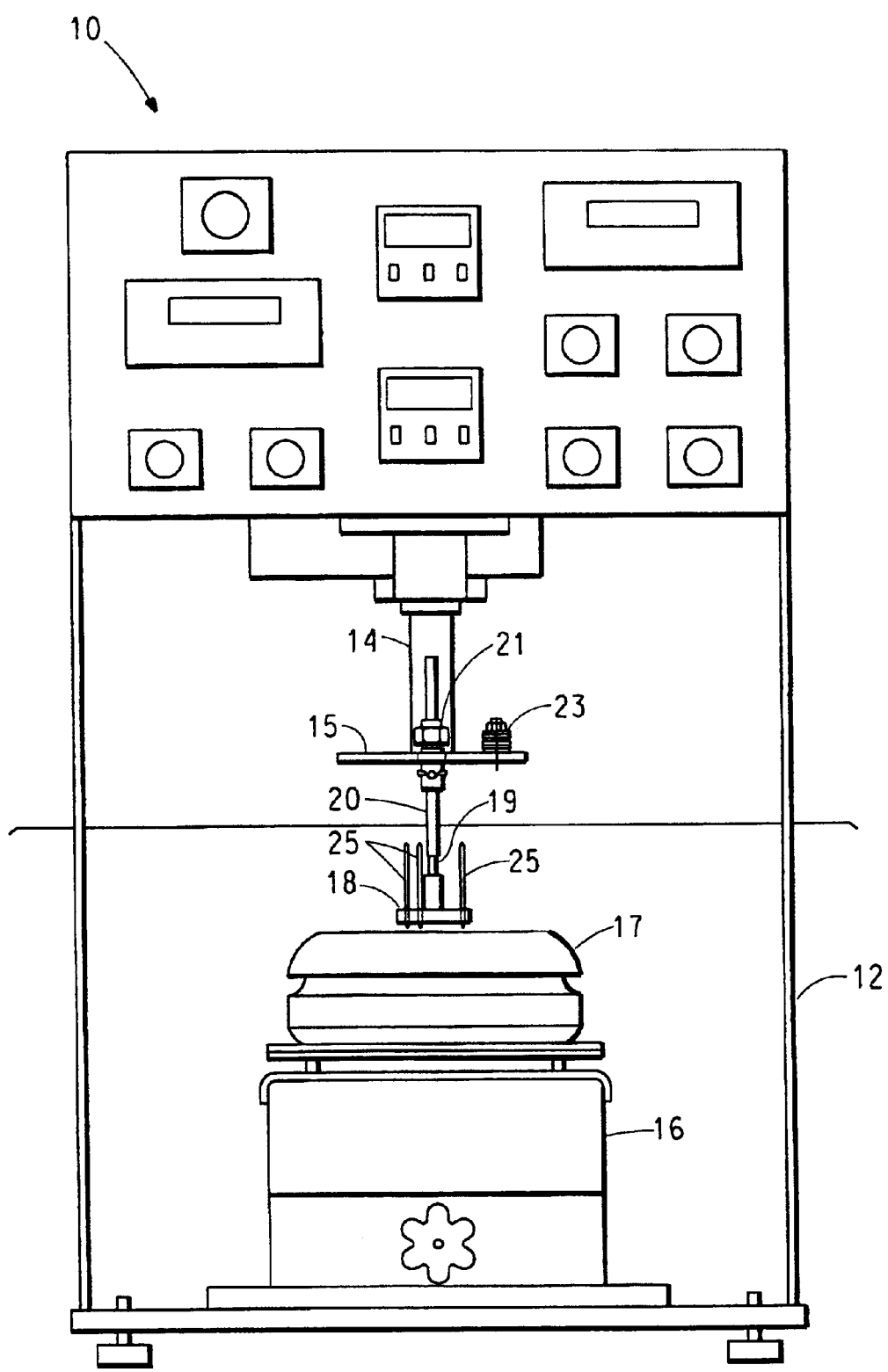
FIG. 1 shows in front elevation an abrasion tester for conducting the MTP Abrasion Test on non-stick-coated substrates.
Figure 2:
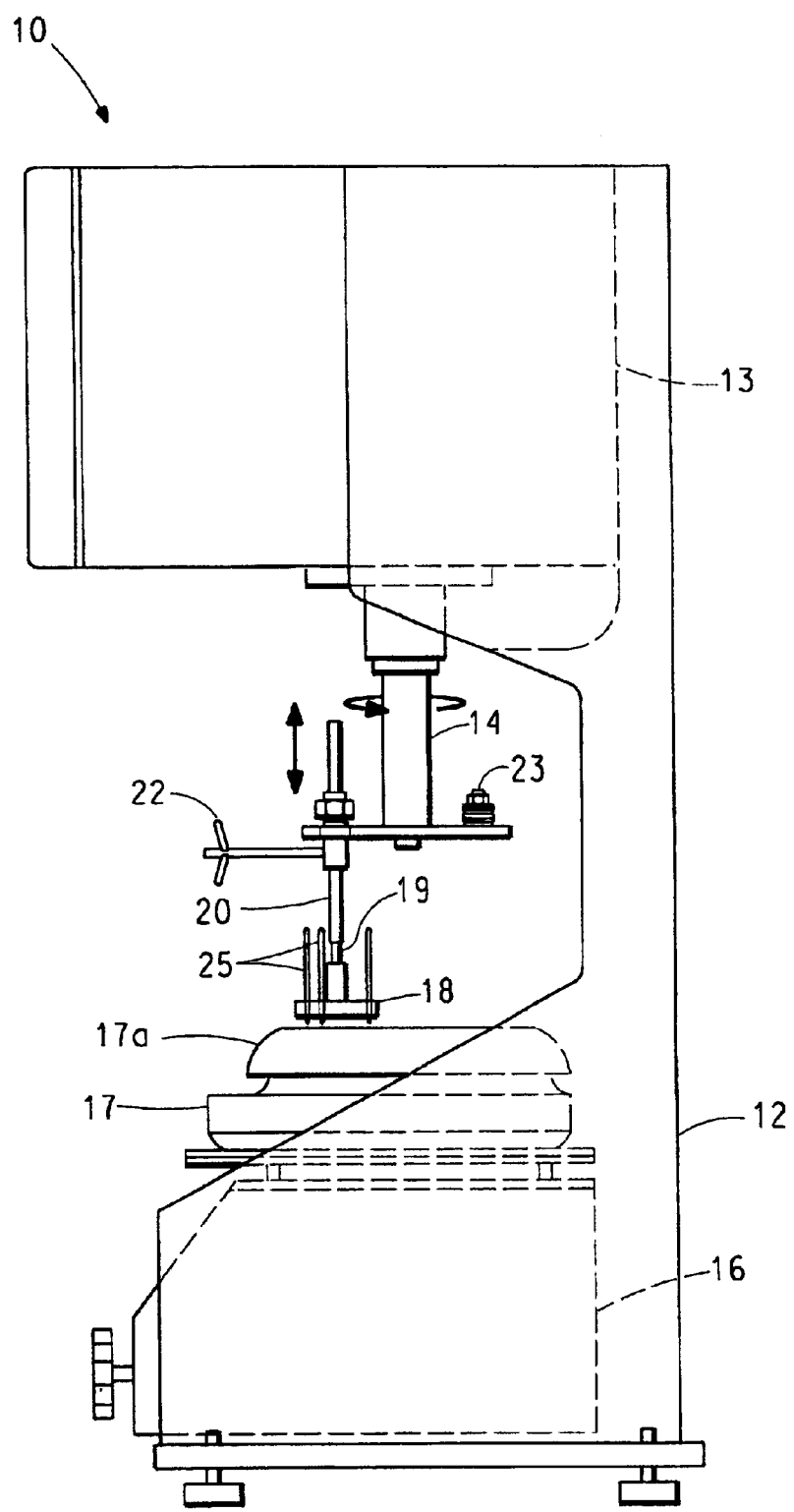
FIG. 2 shows the abrasion tester of FIG. 1 in side elevation.

Mechanical Tiger Paw Abrasion Test (MTP Abrasion Test) A coated substrate is evaluated for abrasion resistance by continuously rotating three weighted ballpoint pen tips on the surface of the coated substrate while the substrate is heated and oscillated back and forth on a shaker table. FIGS. 1 and 2 illustrate the testing equipment, generally referred to as 10 and a coated substrate being tested. The equipment as illustrated comprises a frame 12 onto which is mounted drive motor 13. Extending from the motor is central flywheel drive shaft 14 on which is positioned flywheel (drive disc) 15. The drive disc as shown is aluminum sheeting having a diameter of 7 inches (18 cm) and thickness of 0.25 inch (0.64 cm). Housed within the frame is shaker table 16 on which is mounted hot plate 17. The top of the hot plate provides a surface 17a for placing test substrate 11 such as a frying pan. The vertical distance between surface 17a and the bottom of the drive disc 15 is approximately 6 inches (15 cm). At starting position, flywheel drive shaft 14 is perpendicular and centered with hot plate 17. Shaker table 16 is mounted to the frame so that the center of its reciprocating motion is coincident with the center of flywheel drive shaft 14. The direction of reciprocating motion is front-to-back.

Tiger paw head 18 (FIG. 2) is mounted to drive disc 15 by floating shaft 19 positioned in support shaft tube 20. Support tube 20 is flexibly connected through drive disc 15 with the aid of O-rings, washers and nuts on both sides of the disc. Above the connection, additional washers 21 are added to the shaft to provide additional weight. Support tube 20 is mounted off-center, approximately 2 inches (5 cm) from flywheel drive shaft 14. Adjustment screw 22 bears against support shaft tube 20 and permits alignment of floating shaft 19 articulated within the support shaft tube. Also, positioned on disc 15, 180 degrees from the support tube is counterbalancing weight 23.

Figure 3:
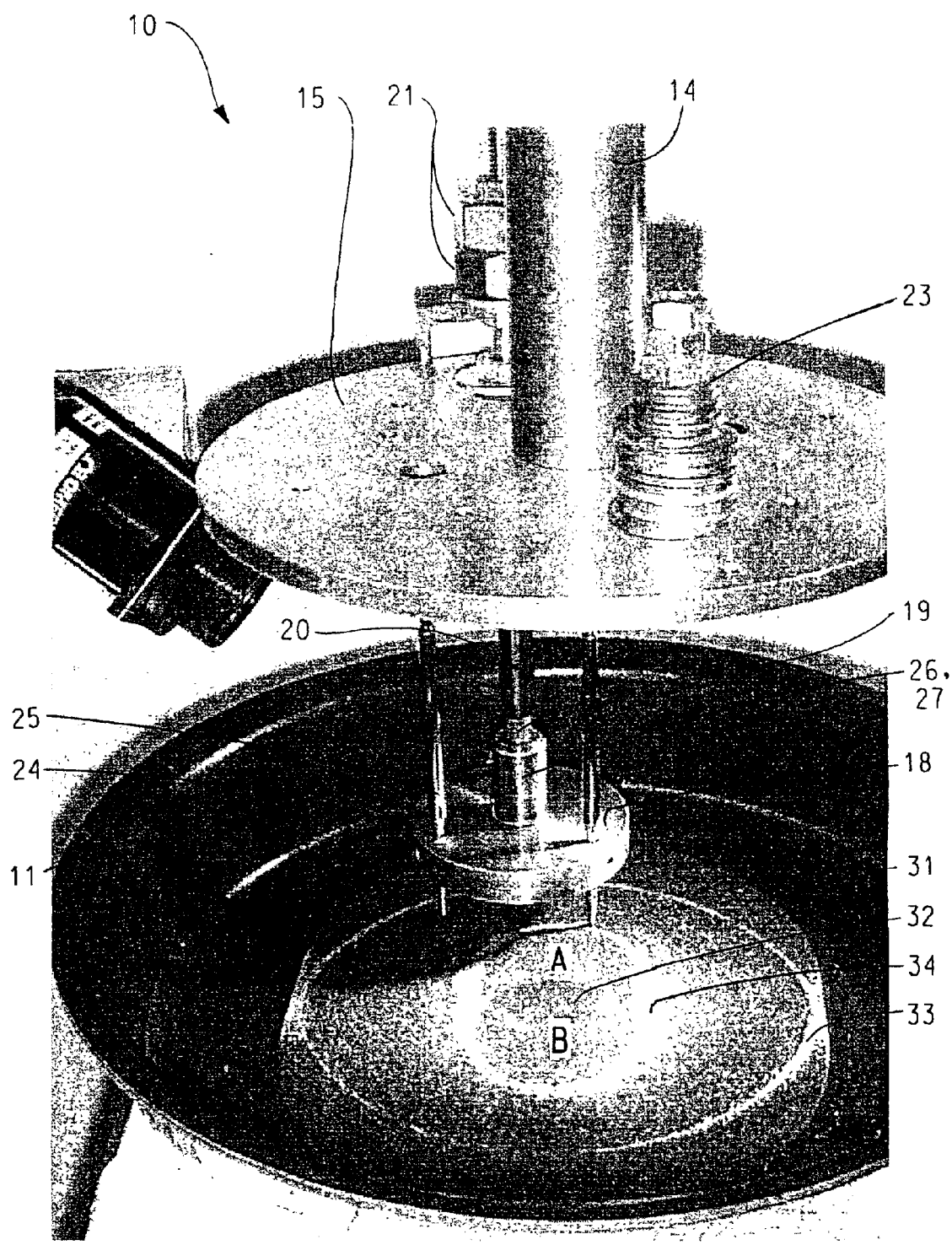
FIG. 3 is an image of a non-stick-coated cookware positioned within the abrasion tester of FIG. 1, showing the abrasion pattern obtained for conventional non-stick coatings.

As shown in FIG. 3, tiger paw head 18 is a rotating disc with three channels 24 positioned near the perimeter of the disc at equidistant angles from the center (i.e., approximately 0, 120, 240 degrees). The channels are sized to each house a ballpoint pen refill 25. Set screws (not shown) are positioned in the side wall of the disc at the location of each channel to lock the pen refills in place during operation. The rotating disc as shown is stainless steel having a diameter of 2.5 inches (6.4 cm) and thickness of 0.4 inch (1 cm). The center of the disc accommodates ball bearing 26 and allows the disc to be attached to floating shaft 19 by coupling 27. The tiger paw head is free to rotate around the floating shaft.

In operation, a fry pan with coated aluminum substrate 11 is washed in mild detergent to remove any dirt or oil. The test pan is placed on hot plate 17 with the aid of a removable centering rod temporarily installed in central drive shaft 14. The centering rod acts a plumb line for pan placement on surface 17a of the hot plate after which the centering rod is removed. For each test, three new pen refills 25 are installed in channels 24 of the tiger paw head 18 so that each refill extends downward ¾ inch (1.9 cm) from the bottom of the disc. The tiger paw head 18 is attached to the floating shaft 19 that extends down from the drive disc 15 attached to the drive shaft 19. The weight of the tiger paw head and floating shaft is regulated. In the equipment illustrated, the weight is approximately 400 g. The combined weight of the floating shaft and washers (all approximately 115 g), the tiger paw head (approximately 279 g), and the ballpoint pen points (approximately 10 g) totals 404 g. The counterbalancing weight 23 also totals approximately 400 g.

The hot plate 17 is turned on and the test substrate (pan) 11 is heated to a temperature of 400° F.+/−10° F. (204° C.+/−6° C.). When the pan reaches test temperature as determined by infrared temperature measurement on the substrate surface, the pen refills are lowered onto the pan and the equipment is activated to begin the shaker table oscillation and tiger paw head rotation. In this way, the testing equipment rotates the pens against and around the surface of the coated substrate. The speed of tiger paw head rotation is controlled at 30 rotations per minute. The speed of the shaker table is controlled for 30 back and forth oscillations per minute. A counter records the number of cycles completed. A timer counts down each 15 minute period of tiger paw rotation in a particular direction. Data is recorded at 15-minute intervals. The rotation of the tiger paw head is reversed after each 15-minute period. Periodically the pen refill points are inspected for build-up of coating. Built-up coating is removed as necessary.

Failure of the coating on substrate 11 is monitored by observing the oval-shaped paths 33, 34 that evolve as the points of the pen refills penetrate through the coating to reach the bare metal substrate. By heating the substrate, the time to failure is accelerated. The longer the time to failure, the better the durability of the non-stick coating.

At the end of each 15-minute cycle, the pan is evaluated according to the following MTP numerical ratings:

| | |
|---|---|
| 10 | New Pan |
| 9 | Grooves in coating |
| 8 | First nick to metal (for on smooth substrates) |
| | Roughening of surface (for grit blasted substrates) |
| 7 | Lines to metal (outside and/or inside) |
| 6 | Oval beginning outside |
| 5 | Oval complete |

To better understand the above rating system, reference is made to FIG. 3. A test pan with coated substrate 11 is shown having an MTP rating of 5 at 150 minutes of the MTP. The pan is not coated with the composition of the invention. The tiger paw head has traversed the circular area circumscribed by line 31, except for the very center portion indicated by the intersection 32 of circles A and B. An outer oval line 33 of bare metal where coating has been worn away appears within the area circumscribed by line 31. An inner oval line 34 of bare metal where the coating has been worn away circumscribes circles A and B. Coating has been worn away from the pan so that the outer oval is completely delineated. The inner oval line 34 is formed as the outer oval is formed.

In contrast, a test pan of the present invention is shown in FIG. 4 with a rating of 9 after being subjected to 420 minutes on the MTP. The surface of the coating exhibits a rippled appearance rather than being worn through to the substrate. The non-stick coating of EP 1016466 shown in FIG. 5 also warrants a rating of 9 after 420 minutes of the MTP, but no ripple pattern is exhibited.

Tiger Paw Cooking (TP)

A coated substrate such as a fry pan is evaluated for cooking performance and abrasion resistance by exposing the coating system to cycles of acid, salt and fat while the substrate is subjected to heat and the manual rotation of a tiger paw head. The test substrate is also subjected to detergent during multiple cleaning operations between food cycles. A scouring pad of synthetic fibers (Dobie) is used during the cleaning cycles.

For each test, coated pans plus a control pan are tested on a commercial gas stove top with sufficient burners to cook all pans simultaneously. The control pan is a standard pan coated with a known commercial cookware coating system for which the standard properties being judged have been predetermined many times. The temperature for the test is maintained at 380° F. (1930° C.) to 400° F. (204° C.) as measured by a contact pyrometer on the substrate surface. The pans are methodically rotated among all the burners. The scratch portion of the test is conducted using a tiger paw head. Similar to the head described above for the MTP test, the tiger paw head is a disc with channels for housing three ballpoint pen refills that are free of damage prior to use. In advance of the test, five food items are prepared for cooking and a detergent solution is prepared:

Item 1: Hamburger—ground meat is formed into hamburger patties and salted heavily on one side.

Item 2: Onions—16 tablespoons of salt are added to a #10 can of onions.

Item 3: Tomato sauce—8 tablespoons of salt are added to 32 oz. tomato sauce and diluted to yield one gallon and then mixed thoroughly.

Item 4: Pancakes—Ready-mix pancake batter is prepared according to package instructions. 4 tablespoons of salt are added per 1 gallon of mix.

Item 5: Eggs—4 dozen eggs, 1 cup water, 4 tablespoons salt are mixed in a blender.

Detergent: 3 capfuls of liquid detergent in 3 gallons of hot water.

In operation, the test pans position are placed on the burners and heated to within the specified temperature range. The pans are subjected to five sequential cooking processes.

Cook 1: Two tablespoons of vegetable oil are placed in the center of the pan. A preformed hamburger patty salted heavily on one side is placed salt side down on the oil. The patty is cooked for 5 minutes. Then a lid is placed on the fry pan and the patty is cooked for five more minutes with the lid on. The patty is then turned over and the patty is allowed to cook for five more minutes with the lid on.

Cook 2: A half-cup of onions is added to each pan and allowed to simmer without a lid for five minutes. Water is added if necessary to keep the ingredients from burning.

Cook 3: Two cups (16 oz.) of prepared tomato sauce mixture is added to each pan and the lid is replaced. When the tomato sauce mixture has been added to all pans, the hamburger patty is removed and the mixture is allowed to simmer for 15 minutes. During this 15-minute simmer period the scratch abuse test is performed using the tiger paw head. The mixture is stirred in each pan with the tiger paw head in a circular pattern for 25 revolutions in a clockwise direction and with 25 more revolutions in a counter clockwise direction. At the conclusion of the 15-minute simmer period, the pans are removed from the burners, contents are emptied and each pan is washed thoroughly with a detergent solution. The pan is rinsed in clear water and wiped dry.

Cook 4: The pans are then returned to the burners in a rotated position and heated to within the specified temperature range. Pancake batter is poured into the center of the pan to form a pancake 5–6 inches. The pancake is allowed to cook until well done and then turned over to cook on the other side. All pancakes are removed. Each pan is quenched in hot water /detergent solution and washed thoroughly. The pans are rinsed and then dried.

Cook 5: The pans are again returned to the burners in a rotated position and heated to within the specified temperature range. In sequence each pan is covered with approximately 8 oz. of beaten egg mixture. The mixture is stirred in each pan with the tiger paw head in a circular pattern for 25 revolutions in a clockwise direction and with 25 more revolutions in a counter clockwise direction. When the eggs are completely cooked, the pans are removed from the burners, contents are emptied and each pan is washed thoroughly with a detergent solution. The pan is rinsed in clear water and wiped dry.

After every 5 cooks the pans are rated for scratch. During cook 4 any problems with release are noted. The pans are then returned to the burners in a rotated position and heated to within the specified temperature range. Testing is resumed beginning with cook 1 (hamburger). Testing continues until a pan is determined to have a scratch rating of 5 at which time testing stops.

Ratings

Scratch (0–10): The scratch rating is determined by a visual comparison of pictures of standard test substrates at specified ratings of 10, 9, 7, 5. The rating of 10 is for a new pan and the rating of 5 signifies a pan with so much abrasion wear that the homemaker would discard the pan.

Accelerated Tiger Paw Cooking (ATP)

The Accelerated Tiger Paw cooking test is an accelerated lower temperature version of the Tiger Paw cooking test explained above. The test evaluates substrates such as fry pans for cooking performance and abrasion resistance by exposing the coating system to cycles of acid, salt and fat and detergent. The substrate is subjected to heat and the manual rotation of a tiger paw head during cooking. The food cycles, temperature conditions and number of tiger paw head rotations are altered as explained below.

For each test, coated pans plus a control pan are tested on a commercial gas stove top with sufficient burners to cook all pans simultaneously. The control pan is a standard is a pan coated with a known commercial cookware coating system for which the standard properties being judged have been predetermined many times. The temperature for the test is maintained at 280° F. (138° C.) to 300° F. (149° C.) as measured by a contact pyrometer on the substrate surface. The pans are methodically rotated among all burners.

In operation, the test pans position are placed on the burners and heated to within the specified temperature range. The pans are subjected to the following cooking process.

An egg is fried in an unseasoned pan. The egg is cooked for 3 minutes. The egg is lifted with a spatula and the pan is tilted to allow for the egg to slide. The ease with which the egg slides is assessed. The pan is returned to the burner and the egg is turned over. The yolk of the egg is broken with a spatula and the egg is cooked for two more minutes. The egg is again lifted with a spatula and the ease with which the egg slides is determined based on the scale designated "release" described above. The pan is also rated for scratch. The pan is rinsed in hot water and wiped out with a paper towel.

Cook 1: One tablespoon of corn oil is placed in the center of the pan. A preformed hamburger patty salted with ¼ teaspoon of salt on one side is placed salt side down on the oil. The patty is cooked for 3 minutes. Then a lid is placed on the fry pan and the patty is cooked for 4 more minutes with the lid on. With the edge of a spoon the patty is cut first into fourths and each fourth is cut into thirds. The meat is removed and the pan is wiped out with a paper towel.

Two cups (16 oz.) of prepared tomato sauce mixture (30 oz. tomato sauce, ½ cup salt, 3 qt. water) is added to each pan and simmered for 20 minutes. During this 20-minute simmer period the scratch abuse test is performed using the tiger paw head. The mixture is stirred in each pan with the tiger paw head in a circular pattern for 50 revolutions in a clockwise direction and with 50 more revolutions in a counter clockwise direction. At the conclusion of the 20-minute simmer period, the pans are removed from the burners, contents are emptied and each pan is washed thoroughly with a detergent solution. The pan is rinsed in clear water and wiped dry.

The pans are returned to the burner and the cooking procedure beginning with placing one tablespoon of oil in the center of the pan is repeated.

After every 4 cooks, an egg is fried as described above and the pan is rated for release and scratch. At the end of every 7 cooks (or if 7 cooks cannot be completed, at the end of each day) each pan is filled with a detergent solution of 2 cups of water, 1 teaspoon of liquid detergent and 3 teaspoons of salt. The detergent is brought to a boil and a lid is placed over the pan. The pan is removed from the burner and allowed to stand overnight. The next day the cycle begins with frying an egg and rating the pan. Testing continues until a pan is determined to have a scratch rating of 5 at which time testing stops. Scratch uses the same scale as that used in the TP test. The release scale is listed below.

Release (0–5): The release rating is determined by assessing how easily the egg slides and how much of the egg sticks to the pan.

| 5 | Excellent |
| 4 | Very good |
| 3 | Good |
| 2 | Fair |
| 1 | Severe |
| 0 | Very Severe |

Mechanical Abrasion and Release Test (MAR)

A coated substrate such as a fry pan is evaluated for both abrasion resistance and release. The coated pan is rigidly mounted on a support over which is mounted a reciprocating weighted vertical arm. A scouring pad is mounted to the end of the arm by means of a disc attached to the arm. The weight of the arm is 10 lbs. and the scouring pad (5 cm×5 cm) is a 7448 Scotch-Brite™ abrasion pad made from synthetic fibers manufactured by 3M. The arm is aligned to reciprocate horizontally across the interior of the fry pan for a path length of 6 inches (15.2 cm) i.e., two path lengths for a total of 12 inches (30.5 cm). A cycle is defined as an arm stroke across the pan and back again. The arm reciprocates at a rate of 54 cycles a minute. The pan is kept stationary and the abrasive pad arm moves backwards and forwards over the path length. After every 10,000 cycles, the arm is halted and a release test is performed.

The release test is a means of determining the ability of the nonstick coating to release an egg. The pan is heated to a range of from 446° F. (230° C.) to 464° F. (240° C.) and maintained in this temperature range as measured by a contact pyrometer on the substrate surface throughout the testing. To conduct the test an egg is broken over the pan and cooked about 20–25 seconds until the egg congeals to a milky white color. A small cocktail fork is worked around the perimeter of the egg and under the egg to loosen it from the pan. The egg is eased over with the fork and removed from the pan. The pan is rated for release on the scale listed below.

The abrasion pad is replaced every 10,000 cycles and the testing continues with application of abrasion and testing for release after every 10,000 cycles.

Release: The release rating is determined by assessing the amount of egg residue remaining on the pan.

Good—No residue

Fair—3 or 4 tiny spots of egg, some small specs of brown carbonized residue

Poor—Egg sticks, a lot of brown carbonized residue

AIHAT

A coated substrate such as a fry pan is subjected to a series of high temperature cooking cycles using common household metal cooking utensils (fork, spatula, whisk, knife). A description of the test is described in U.S. Pat. No. 5,250,356 (Batzar) column 3, lines 11–64. The test is a measure of mar and scratch from common cooking abuse.

Dried Film Thickness (DFT)

The baked coating thickness is measured with a film thickness instrument, e.g., Fisherscope, based on the eddy-current principle (ASTM B244).

EXAMPLES

Fluoropolymer

PTFE dispersion: DuPont TFE fluoropolymer resin dispersion grade 30, available from the DuPont Company, Wilmington, Del.

FEP dispersion: TFE/HFP fluoropolymer resin dispersion with a solids content of from 54.5–56.5 wt % and RDPS of from 150–210 nanometers, the resin having an HFP content of from 9.3–12.4 wt % and a melt flow rate of 11.8–21.3 measured at 372° C. by the method of ASTM D-1238 modified as described in U.S. Pat. No. 4,380,618.

PFA dispersion: DuPont PFA fluoropolymer resin dispersion grade 335, available from the DuPont Company, Wilmington, Del.

Polymer Binder

PAI is Torlon® Al-10 poly(amide-imide) (Amoco Chemicals Corp.), a solid resin (which can be reverted to polyamic salt) containing 6–8% of residual NMP.

Polyamic acid salt is generally available as polyamic acid having an inherent viscosity of at least 0.1 as measured as a 0.5 wt % solution in N,N-dimethylacetamide at 30° C. It is dissolved in a coalescing agent such as N-methyl pyrrolidone, and a viscosity reducing agent, such as furfuryl alcohol and reacted with tertiary amine, preferably triethyl amine to form the salt which is soluble in water, as described in greater detail in U.S. Pat. No. 4,014,834 (Concannon).

Inorganic Film Hardener

Silicon carbide supplied by Elektroschmelzwerk Kempten GmbH (ESK), Munich Germany P 600=25.8±1 micrometers average particle size P 400=35.0±1.5 micrometers average particle size P 320=46.2±1.5 micrometers average particle size The average particle size is measured by sedimentation using FEPA-Standard-43-GB 1984R 1993 resp. ISO 6344 according to information provided by the supplier.

Aluminum oxide (small particles) are Ceralox HPA0.5 supplied by Condea Vista Co. average particle size 0.35–0.50 micrometers.

Example 1

A 3-coat non-stick system representative of the invention is sprayed onto test pans of smooth aluminum that have been treated only by washing to remove grease but not mechanically roughened. The aqueous dispersion compositions of the primer, intermediate coat and topcoat are listed in Tables 1, 2 and 3 respectively. The dried coating thicknesses (DFT) for primer/midcoat/topcoat are determined from eddy current analysis to be 0.4 mils (10.2 micrometers)/0.7 mils (17.8 micrometers)/0.3 mils (7.6 micrometers).

The primer layer contains fluoropolymer, binder and inorganic film hardener. The fluoropolymer to binder ratio is 1.5:1. The inorganic film hardener contains large particles of SiC and small particles of aluminum oxide. The total inorganic film hardener content is approximately 40.3 wt % of the baked weight of the primer layer. The large particles are essentially encapsulated by the primer layer and form spaced apart anchor points extending into the midcoat. The SiC is a blend of three grades P320/P400/P600 in approximately equal weight proportions. The SiC blend is approximately 10.4 wt % of the baked weight of the primer layer. The large particles of SiC are about 26 wt % of the total amount of inorganic film hardener in the primer layer. The thickness of the midcoat is approximately 1.8× the thickness of the primer. The midcoat also contains inorganic filler film hardener. The inorganic film hardener in the midcoat are small particles of aluminum oxide that are 15.4 wt % of the baked weight of the midcoat layer.

The primer is sprayed onto the aluminum substrate and dried at 150° F. (66° C.) for 5 minutes. The intermediate coat is then sprayed over the dried primer. The topcoat is applied (sprayed) wet on wet to the intermediate coat. The coating is cured by baking at a temperature of 800° F. (427° C.) for 5 minutes.

TABLE 1

Primer Composition

| Ingredients | Weight Percent |
| --- | --- |
| PAI-1 | 4.48 |
| Water | 67.44 |
| Furfuryl Alcohol | 3.30 |
| Diethylethanolamine | 0.63 |
| Triethylamine | 1.26 |
| Triethanolamine | 0.01 |
| N-Methylpyrrolidone | 2.94 |
| SiC P400 | 0.82 |
| SiC P600 | 0.82 |
| SiC P320 | 0.82 |
| PTFE (solids in aqueous dispersion) | 4.09 |
| Alkylphenylethoxy surfactant | 0.50 |
| FEP (solids in aqueous dispersion) | 2.74 |
| Ludox AM polysilicate | 0.82 |
| Utramarine blue pigment | 1.53 |
| Carbon black pigment | 0.26 |
| Alumina 0.35–0.50 micrometers | 7.02 |
| Zinc phosphate | 0.09 |
| 4,4-Methylenedianiline | 0.05 |
| Sodium naphthalenesulfonic acid | 0.151 |
| Hydroxypropyl cellulose | 0.02 |
| Total | 100 |

% solids = 23.7

TABLE 2

Midcoat

| Ingredients | Weight Percent |
| --- | --- |
| PTFE (solids in aqueous dispersion) | 28.39 |
| Water | 32.37 |

TABLE 2-continued

Midcoat

| Ingredients | Weight Percent |
| --- | --- |
| PFA (solids in aqueous dispersion) | 5.01 |
| Octylphenolpolyethoxy nonionic surfactant | 2.60 |
| Mica Iriodin 153 from MERCK | 0.73 |
| Ultramarine blue pigment | 0.30 |
| Alumina 0.35–0.50 micrometers | 6.56 |
| Triethanolamine | 3.91 |
| Cerium octoate | 0.49 |
| Oleic acid | 1.03 |
| Butylcarbitol | 2.04 |
| Acrylic resin | 12.8 |
| Carbon black | 1.05 |
| Hydrocarbon solvent | 2.50 |
| Sodium naphthalenesulfonic acid | 0.22 |
| Total | 100 |

TABLE 3

Topcoat

| Ingredients | Weight Percent |
| --- | --- |
| PTFE (solids in aqueous dispersion) | 39.68 |
| Water | 30.13 |
| PFA (solids in aqueous dispersion) | 2.09 |
| Octylphenolpolyethoxy nonionic surfactant | 3.03 |
| Mica Iriodin 153 from MERCK | 0.37 |
| Cerium octoate | 0.58 |
| Oleic acid | 1.22 |
| Butylcarbitol | 2.42 |
| Triethanolamine | 4.60 |
| Solvesso 100 hydrocarbon | 2.96 |
| Acrylic resin | 12.93 |
| Total | 100 |

Comparison Example 2

EP 1 016 466 A2

A 3-coat non-stick system using compositions similar to those described in Example 3 of EP 1016 466 A2 is sprayed onto test pans of smooth aluminum that have been treated only by washing to remove grease but not mechanically roughened. The compositions of the primer, intermediate coat and topcoat are listed in Tables 4, 5, and 6 respectively. The dried coating thicknesses (DFT) for primer/midcoat/topcoat are determined from eddy current analysis to be 17 micrometers/15 micrometers/7 micrometers.

The primer layer contains fluoropolymer, binder and inorganic film hardener. The fluoropolymer to binder ratio is 1.5:1. The inorganic film hardener contains large particles of SiC and small particles of aluminum oxide. The total inorganic film hardener content is approximately 52 wt % of the baked weight of the primer layer. The SiC powder particles is approximately 27 wt % of the baked weight of the primer layer. The midcoat also contains inorganic filler film hardener. The inorganic film hardener in the midcoat are small particles of aluminum oxide that are 5.4 wt % of the baked weight of the midcoat layer. Primer, midcoat and topcoat are sprayed and baked under the same conditions as described in Example 1.

TABLE 4

Primer Composition

| Ingredients | Weight Percent |
| --- | --- |
| PAI-1 | 4.28 |
| Water | 59.35 |
| Furfuryl Alcohol | 3.30 |
| Diethylethanolamine | 0.60 |
| Triethylamine | 1.21 |
| Triethanolamine | 0.20 |
| N-Methylpyrrolidone | 2.81 |
| Furfuryl Alcohol | 1.49 |
| Surfynol 440 surfactant | 0.22 |
| SiC P400 | 3.30 |
| SiC P600 | 3.30 |
| SiC P320 | 1.66 |
| PTFE (solids in aqueous dispersion) | 3.86 |
| Alkylphenylethoxy surfactant | 1.59 |
| FEP (solids in aqueous dispersion) | 2.65 |
| Ludox AM polysilicate | 0.87 |
| Utramarine blue pigment | 1.63 |
| Carbon black pigment | 0.28 |
| Alumina 0.35–0.50 micrometers | 7.40 |
| Total | 100 |

% solids = 30.4

TABLE 5

Midcoat

| Ingredients | Weight Percent |
| --- | --- |
| PTFE (solids in aqueous dispersion) | 33.80 |
| Nonylphenolpolyethoxy nonionic surfactant | 3.38 |
| Water | 34.82 |
| PFA (solids in aqueous dispersion) | 6.10 |
| Octylphenolpolyethoxy nonionic surfactant | 2.03 |
| Mica Iriodin 153 from MERCK | 1.00 |
| Ultramarine blue pigment | 0.52 |
| Alumina 0.35–0.50 micrometers | 2.39 |
| Triethanolamine | 5.87 |
| Cerium octoate | 0.57 |
| Oleic acid | 1.21 |
| Butylcarbitol | 1.52 |
| Solvesso 100 hydrocarbon | 1.90 |
| Acrylic resin | 4.89 |
| Total | 100 |

TABLE 6

Topcoat

| Ingredients | Weight Percent |
| --- | --- |
| PTFE (solids in aqueous dispersion) | 40.05 |
| Nonylphenolpolyethoxy nonionic surfactant | 4.00 |
| Water | 35.56 |
| PFA (solids in aqueous dispersion) | 2.11 |
| Octylphenolpolyethoxy nonionic surfactant | 1.36 |
| Mica Iriodin 153 from MERCK | 0.43 |
| Cerium octoate | 0.59 |
| Oleic acid | 1.23 |
| Butylcarbitol | 1.55 |
| Triethanolamine | 5.96 |
| Solvesso 100 hydrocarbon | 1.94 |
| Acrylic resin | 5.22 |
| Total | 100 |

Example 3
Performance Testing Abrasion and Release

Five test pans from Example 1 and Comparative Example 2 are subjected to AIHAT scratch test, MTP Abrasion Test, TP cooking test, ATP accelerated cooking test and MAR abrasion and release test. The results are shown in Table 7.

When subjected to the rigors of a cooking environment, the test pans of Example 1 display an increased number of cooking cycles on both the standard TP cooking test and on the ATP accelerated cooking test over the test pans of Example 2.

The outstanding MTP performance of the comparative system (Example 2) is equaled by the test pans of Example 1. However, as has been explained before, the repeated, reciprocating abrasion applied to the coating of the pans from Example 1 by the MTP Abrasion Test rearranges the topcoat layer, rather than removing it resulting in a rippled pattern (FIG. 8). In contrast, the non-stick coating of Comparative Example 2 when subjected to the same MTP Abrasion Test is not rippled in appearance (FIG. 5). The rearrangement of the topcoat layer of the test pans of this invention results in better release performance as demonstrated by the MAR test.

The MAR test shows that test pans of this invention continue to receive a rating of good release even after 300,000 cycles of abrasion. In contrast the test pans of the comparative system retain a rating of good only up to 100,000 cycles of abrasion.

In the AIHAT test which uses common household metal cooking utensils during high heat cooking cycles, the test pans of Example 1 show a 60% improvement over the test pans of Comparative Example 2. The large ceramic particles in the primer layer in combination with a thicker, more reinforced midcoat of the invention produce pans with increased scratch resistance.

TABLE 7

| TEST | Avg 5 test pans |
| --- | --- |
| AIHAT | |
| Ex 1 | 8 |
| Comp Ex 2 | 5 |
| TP | cooks |
| Ex 1 | 120 |
| Comp Ex 2 | 79 |
| ATP | cooks |
| Ex 1 | 34.6 |
| Comp Ex 2 | 22.8 |
| MTP | minutes |
| Ex 1 | 420 |
| Comp Ex 2 | 420 |
| MAR | cycles |
| Ex 1 | >300,000 |
| Comp Ex 2 | 100,000 |

Example 4
Effect of Midcoat Thickness on Performance

Using the coating compositions of Example 1 for primer, intermediate coating, and topcoat, a 3-coat non-stick system is sprayed onto test pans of smooth aluminum that have been treated only by washing to remove grease but not mechanically roughened. Spraying, drying and baking conditions are the same as used for Example 1. The thickness of the midcoat is varied.

The dried coating thicknesses (DFT) for primer/midcoat/topcoat are determined by eddy current and are listed in Table 8. The test pans are submitted to MTP abrasion and ATP accelerated cooking tests. Both samples 4A and 4B show high MTP abrasion performance at 420 minutes with a rating of 9. Example 4B with a midcoat thickness of twice that of the primer thickness shows improved performance in ATP abrasion and in release.

TABLE 8

| Sample | PRIMER | MIDCOAT | TOPCOAT | MTP | ATP/RELEASE |
|---|---|---|---|---|---|
| Ex 4A | 0.45 mils (11.4 micrometers) | 0.25 mils (6.4 micrometers) | 0.33 mils (8.4 micrometers) | 420/9 | 15/4 |
| Ex 4B | 0.45 mils (11.4 micrometers) | 0.50 mils (12.8 micrometers) | 0.33 mils (8.4 micrometers) | 420/9 | 24/5 |

Example 5
Effect of Inorganic Film Hardener Concentration

Using the coating compositions of Example 1 for primer, intermediate coating, and topcoat, a 3-coat non-stick system is sprayed onto test pans of smooth aluminum that have been treated only by washing to remove grease but not mechanically roughened. Three pans are coated and tested for each sample listed in Table 9. The amount of SiC in the primer is varied. Spraying, drying and baking conditions are the same as used for Example 1. The dried coating thicknesses (DFT) for primer/midcoat/topcoat are determined by eddy current to be 0.4 mils (10.2 micrometers)/0.7 mils (17.8 micrometers)/0.3 mils (7.6 micrometers).

The test pans are submitted to MTP abrasion and ATP accelerated cooking tests. Example 5A with only 5 wt % SiC in the primer reaches a rating 5 on the MTP abrasion test after 300 minutes and fails to develop a ripple pattern. Samples 5B, 5C, 5D and 5E all show high MTP abrasion performance at 420 minutes with ratings of 9 and exhibit a ripple pattern. Examples 5A, 5B and 5C all exhibit a ATP release of 3. Examples 5D and 5E with 20 wt % and 10 wt % respectively in the primer show high ATP abrasion and a ATP release performance of 4 or better. Comparison of ATP abrasion of Examples 5B and 5C with Examples 5D and 5E shows that reducing the amount of large ceramic particles in the primer layer improves both abrasion resistance and release under cooking conditions.

TABLE 9

|  | $Al_2O_3$ | Total SiC* | MTP | ATP |
|---|---|---|---|---|
| Ex 5A | 35 | 5 | 300/5 | 28 |
| Ex 5B | 5 | 35 | 420/9 | 21 |
| Ex 5C | 10 | 30 | 420/9 | 23 |
| Ex 5D | 20 | 20 | 420/9 | 27 |
| Ex 5E | 30 | 10 | 420/9 | 31 |

*The total SiC is a blend of three grades P320/P400/P600 in approximately equal weight proportions.

What is claimed is:

1. A substrate having a baked non-stick coating thereon, said non-stick coating comprising
   (a) a primer layer adhered to said substrate, said primer layer containing fluoropolymer, polymer binder, and inorganic film hardener, said inorganic film hardener including large ceramic particles essentially encapsulated by said primer layer and anchored therein,
   (b) a midcoat layer adhered to said primer layer, the encapsulated large particles in said primer layer extending into said midcoat layer, said midcoat layer containing fluoropolymer and particles of inorganic film hardener reinforcing said midcoat layer and entirely contained there within,
   (c) a topcoat layer containing fluoropolymer adhered to said midcoat, the anchoring of said large particles by said primer layer and the reinforcement of said midcoat layer cooperating to translate abrasion force applied to said topcoat layer into mechanical engagement between said topcoat layer and midcoat layer rather than wearing away of said topcoat layer, whereby said topcoat layer remains available in said non-stick coating to provide continuing non-stick property to said coating after application of said abrasion forces said abrasion force is applied by the MTP Abrasion Test, said coating having a rippled pattern appearance in the region of abrasion by said MTP abrasion test.

2. The coated substrate of claim 1 wherein said coating has a rating of at least 9 after 240 mm of the MTP abrasion test.

3. The coated substrate of claim 1 wherein said midcoat layer is thicker than said primer layer.

4. The coated substrate of claim 3, wherein said midcoat layer contains at least 8 wt % of said inorganic film hardener.

5. The coated substrate of claim 1 wherein said primer layer contains 5 to 20 wt % of said large ceramic particles.

6. The coated substrate of claim 5 wherein said primer layer is no greater than 14 micrometers thick.

7. The coated substrate of claim 6 wherein said large ceramic particles comprise less than 30 wt % of the total weight of said inorganic film hardener.

8. The substrate of claim 1 wherein the aspect ratio of said large ceramic particles is no greater than 2.5.

9. A substrate having a baked non-stick coating thereon, said non-stick coating comprising
   (a) a primer layer adhered to said substrate, said primer layer containing fluoropolymer, polymer binder, and inorganic film hardener, said inorganic film hardener comprising large ceramic particles essentially encapsulated by said primer layer and anchored therein and smaller particles totally contained with the thickness of the primer layer, said large particles constituting no greater than 20 wt % of said primer layer,
   (b) a midcoat layer adhered to said primer layer, the encapsulated large ceramic particles in said primer layer extending into said midcoat layer, said midcoat layer containing fluoropolymer and at least 8 wt % of particles of inorganic film hardener, said particles being entirely contained within said midcoat layer, said midcoat layer being thicker than said primer layer
   (c) a topcoat containing fluoropolymer adhered to said midcoat.

10. The substrate of claim 9 wherein the aspect ratio of said large ceramic particles is no greater than 2.5.

11. A substrate having a baked non-stick coating thereon, said non-stick coating comprising
   (a) a primer layer adhered to said substrate, said primer layer containing fluoropolymer, polymer binder, and inorganic film hardener, said inorganic film hardener comprising large ceramic particles essentially encapsulated by said primer layer and anchored therein and smaller particles totally contained with the thickness of the primer layer, said large particles constituting no greater than 20 wt % of said primer layers (b) a midcoat layer adhered to said primer layer, the encapsulated large ceramic particles in said primer layer extending into said midcoat layer, said midcoat layer being thicker than said primer layer (c) a topcoat containing fluoropolymer adhered to said midcoat.

12. The substrate of claim 11 wherein the aspect ratio of said large ceramic particles is no greater than 2.5.

* * * * *